(12) United States Patent
Lee et al.

(10) Patent No.: US 12,436,574 B2
(45) Date of Patent: Oct. 7, 2025

(54) SYSTEM FOR MEMORY MODULE MOUNTING TEST AND METHOD THEREFOR

(71) Applicant: ATECO INC., Gunpo-si (KR)

(72) Inventors: Taek Seon Lee, Hwaseong-si (KR); Ho Nam Kim, Seongnam-si (KR); Sang Bong Lee, Suwon-si (KR); Ki Sung Kim, Ansan-si (KR)

(73) Assignee: ATECO INC., Gunpo-si (KR)

( * ) Notice: Subject to any disclaimer, the term of this patent is extended or adjusted under 35 U.S.C. 154(b) by 220 days.

(21) Appl. No.: 18/341,862

(22) Filed: Jun. 27, 2023

(65) Prior Publication Data

US 2024/0176399 A1 May 30, 2024

(30) Foreign Application Priority Data

Nov. 28, 2022 (KR) .......................... 10-2022-0162025

(51) Int. Cl.
*G06F 1/16* (2006.01)

(52) U.S. Cl.
CPC .................................. *G06F 1/1658* (2013.01)

(58) Field of Classification Search
None
See application file for complete search history.

(56) References Cited

U.S. PATENT DOCUMENTS

| | | | |
|---|---|---|---|
| 2010/0218050 A1* | 8/2010 | Co | G11C 29/56016 714/E11.17 |
| 2018/0313890 A1* | 11/2018 | Wolff | G01R 31/2893 |
| 2022/0284982 A1* | 9/2022 | Ranganathan | G11C 29/56016 |
| 2023/0412926 A1* | 12/2023 | Kim | G06V 10/761 |

FOREIGN PATENT DOCUMENTS

| | | |
|---|---|---|
| JP | 2000-200810 A | 7/2000 |
| JP | 2013-148396 A | 8/2013 |
| KR | 10-2018-0101149 A | 9/2018 |
| KR | 10-2021-0019344 A | 2/2021 |
| KR | 10-2270587 B1 | 6/2021 |
| KR | 10-2329230 B1 | 11/2021 |

\* cited by examiner

*Primary Examiner* — Noam Reisner

(57) ABSTRACT

A system for a memory module mounting test according to an embodiment of the present disclosure includes: a test tray on which a memory module array in which a plurality of memory modules are positioned in a predetermined pattern is loaded; a tester in which the test tray is able to be seated and a socket corresponding to the predetermined pattern is formed to perform a test on the memory module array; a transfer for transferring the test tray from an initial position to a seating position where the test tray is seated in the tester; and a mounter for mounting the memory module array transferred to the seating position in the socket.

6 Claims, 14 Drawing Sheets

SYSTEM FOR MEMORY MODULE MOUNTING TEST AND METHOD THEREFOR

CROSS-REFERENCE TO RELATED APPLICATIONS

This application claims the benefit of Korean Patent Application No. 10-2022-0162025, filed on Nov. 28, 2022, the contents of which are all hereby incorporated by reference herein in their entirety.

BACKGROUND

Field

The present disclosure relates to a system for a memory module mounting test and a method therefor.

Related Art

A memory module refers to a main memory unit of a computer, and is detachably mounted to a motherboard. The memory module is subjected to various quality tests for testing individual performance after manufactured. However, there have been frequent cases in which a memory module determined to have no abnormality does not operate normally during actual use.

Because of this situation, the memory module is often subjected to a mounting test to determine whether normal operation is possible in an environment similar to actual use before shipment. During the mounting test, the memory module is inserted into the socket of an actual motherboard (or main board) and evaluated for normal operation in a mounted state.

This mounting test was implemented by a worker manually or an automated hand mounting the memory module one by one into the socket. Accordingly, it took a considerable amount of time to conduct a mounting test on a large number of memory modules.

In addition, when the mounting of the memory module is automated, when the socket and the memory module are mounted in a dislocated state, mounting is not possible or the memory module is damaged during the mounting process. To prevent this, it was necessary to teach the mounting of each memory module, and this work likewise took a considerable amount of time.

SUMMARY

An aspect of the present disclosure is directed to providing a system for a memory module mounting test and a method therefor capable of performing a rapid mounting test on a large number of memory modules.

In addition, an aspect of the present disclosure is directed to preventing a memory module and a socket from being dislocated during a process of mounting the memory module, making it impossible to perform a test or damaging the memory module, without a separate teaching work.

The aspects of the present disclosure are not limited to those mentioned above, and other aspects not mentioned herein will be clearly understood by those skilled in the art from the following description.

The system for the memory module mounting test according to an embodiment of the present disclosure includes: a test tray on which a memory module array in which a plurality of memory modules are positioned in a predetermined pattern is loaded; a tester in which the test tray is able to be seated and a socket corresponding to the predetermined pattern is formed to perform a test on the memory module array; a transfer for transferring the test tray from an initial position to a seating position where the test tray is seated in the tester; and a mounter for mounting the memory module array transferred to the seating position in the socket.

The transfer includes: a support portion supporting the test tray positioned at the initial position; a first driving portion transferring the support portion from the initial position to the seating position; a second driving portion rotating the support portion; an angle adjustment sensor for understanding an adjustment angle at which the support portion needs to be rotated to arrange the memory module array with the socket; and a control portion for controlling the first driving portion and the second driving portion so that the support portion is transferred to the seating position and rotated in response to the adjustment angle.

The angle adjustment sensor may be positioned adjacent to the socket, and understand the adjustment angle by recognizing two setting areas that guide a disposition state of the socket.

The two setting areas may be more protruded or recessed than adjacent areas.

The angle adjustment sensor may scan an area including the two set areas, measure a distance, and recognize two areas having a critical distance difference from surroundings in the scanned area as the two setting areas.

The angle adjustment sensor may measure a distance by scanning a first area including one of the two setting areas and a second area including the other of the two setting areas, respectively, and recognize two areas having a critical distance difference from surroundings in the first area and the second area as the two setting areas.

An optically recognizable marker may be disposed in the two setting areas, and the angle adjustment sensor may recognize the two setting areas based on light reflected from the marker.

The initial position and the seating position may have different coordinates along a first axis, a second axis, and a third axis. The first driving portion may include a first axis driving portion for transferring the support portion along the first axis, a second axis driving portion for transferring the support portion along the second axis, and a third axis driving portion for transferring the support portion along the third axis.

The test tray may move along the first axis and the second axis and then enter the seating position along the third axis.

The two setting areas may be positioned such that an imaginary line connecting the two setting areas forms a preset angle to the third axis.

The transfer may further include a rail formed along the first axis so that the first axis driving portion transfers the support portion.

A plurality of testers may be provided, and the plurality of testers may be arranged on both sides of the rail along a longitudinal direction of the rail.

The control portion may have the test tray seated in each of the testers in a preset order.

A plurality of through slits into which the memory modules are respectively inserted may be formed in the test tray.

The mounter may press the memory module array on one side of the through slit to mount the memory module array on the socket positioned on the other side of the through slit.

The method for the memory module mounting test according to an embodiment of the present disclosure includes: loading a memory module array in which a plurality of memory modules are positioned in a predetermined pattern on a test tray; transferring, by a transferer, the test tray to a tester in which a socket corresponding to the predetermined pattern is formed; rotating the test tray by the transfer so that the memory module array is arranged with the socket; and mounting, by a mounter, the memory module array in the socket and performing, by the tester, a test on the memory module array.

Other details of the present disclosure are included in the detailed description and drawings.

According to embodiments of the present disclosure, at least the following benefits are provided.

It is possible to perform a rapid mounting test for a large number of memory modules.

The benefits of the present disclosure are not limited thereto, and the disclosure encompass other various benefits.

DESCRIPTION OF EXEMPLARY EMBODIMENTS

Figure 1:
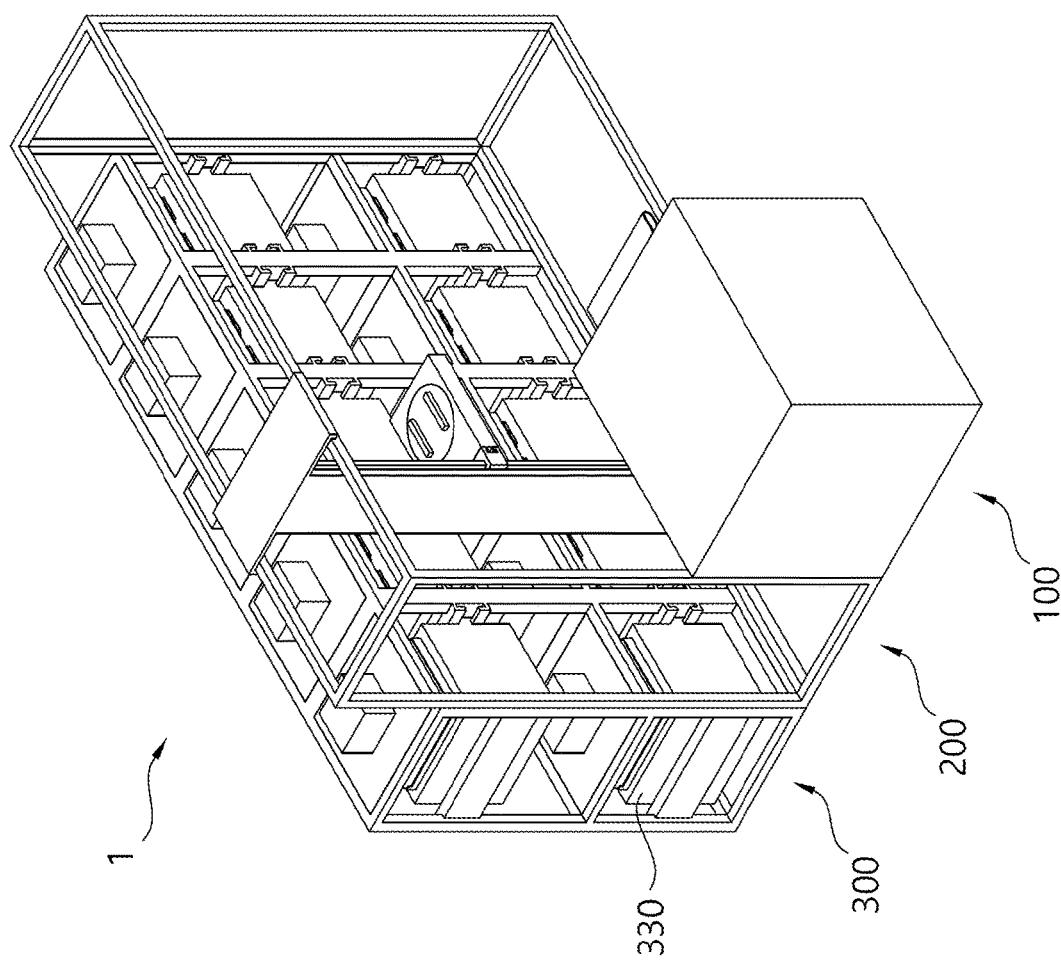
FIG. 1 is a perspective view of a system for a memory module mounting test according to an embodiment of the present disclosure.

Advantages, features, and methods of accomplishing the same of the present disclosure will become apparent with reference to embodiments described in detail below together with the accompanying drawings. However, the present disclosure is not limited by embodiments disclosed hereinafter, and may be implemented in various forms. Rather, these embodiments are provided to so that this disclosure will be through and complete and will fully convey the scope of the present disclosure to those skilled in the technical field to which the present disclosure pertains, and the present disclosure will only be defined by the appended claims.

In addition, the embodiments described herein will be described with reference to cross-sectional diagrams and/or schematic diagrams, which are ideal exemplary views of the present disclosure. Accordingly, variations from the shapes of the exemplary diagrams as a result, for example, of manufacturing techniques and/or tolerances are to be expected. In addition, in each drawing illustrated in the present disclosure, each component may be illustrated somewhat enlarged or reduced in consideration of convenience of explanation. Like reference numerals designate like components throughout the specification.

Hereinafter, the present disclosure will be described with reference to the drawings for explaining a system for a memory module mounting test and a method therefor according to an embodiment of the present disclosure.

FIG. 1 is a perspective view of a system for a memory module mounting test according to an embodiment of the present disclosure.

As illustrated in FIG. 1, a system 1 for a memory module mounting test according to an embodiment of the present disclosure may include a handler 100, a transfer 200, and a tester array 300.

The handler 100 may be a unit that receives a memory module requiring a mounting test from the outside and stores the memory module for which a mounting test is completed before being carried out. More specifically, when memory modules are carried in the handler 100, the handler 100 may arrange the memory modules on a test tray to be described later.

In addition, the handler 100 may dispose the memory module for which the mounting test has been completed so as to be carried out. In this connection, the handler 100 may classify and disclose the memory modules according to the result of the mounting test.

The transfer 200 may be a transfer unit that transfers the memory module between a tester 330 and the handler 100. The transfer 200 may transfer the memory module stored in the handler 100 to the tester 330 to perform a mounting test. In addition, the transfer 200 may take out the memory module for which the mounting test has been completed from the tester 330 and transfer the same to the handler 100.

The transfer 200 may be formed to support the test tray and then move the same in 6-axis directions. In addition, the transfer 200 may be formed to rotate the holding test tray. A detailed description thereof will be given later.

Hereinafter, for convenience of description, a position where the transfer 200 supports a test tray 30 in the handler 100 is referred to as an initial position. In addition, a position where the transfer 200 have the test tray 30 seated in the tester 330 is referred to as a seating position.

A tester array 300 may be formed by arranging a plurality of testers 330. The tester 330 may be a test unit that tests the mounting of the memory module. The tester 330 may include a motherboard and a socket electrically connected to the motherboard.

FIG. 1 illustrates that the tester array 300 is disposed on only one side of the transfer 200, but the present disclosure is not limited thereto. For example, the tester array 300 may be symmetrically disposed on both sides of the transfer 200 as needed. For example, the testers 330 may be arranged spaced apart at predetermined intervals in vertical and horizontal directions. In addition, in FIG. 1, the tester 330 is disposed in two upper and lower stages as an example, but is not limited thereto, and the number of layers of the tester 330 may be freely set.

Figure 2:
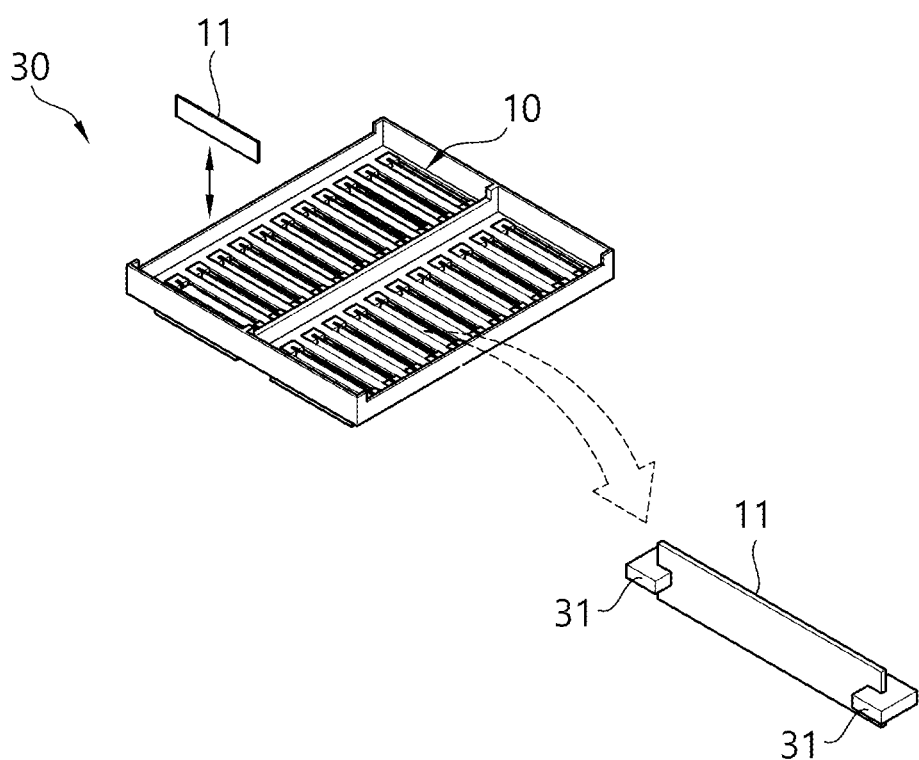
FIG. 2 is a view of a test tray according to an embodiment of the present disclosure.

FIG. 2 is a view of a test tray according to an embodiment of the present disclosure.

As illustrated in FIG. 2, the test tray 30 may be a tray on which the memory module array 10 is loaded. Herein, the memory module array 10 may be formed by disposing a plurality of memory modules 11 in a predetermined pattern.

A through slit (unnumbered) into which a memory module 11 is mounted may be formed in the test tray 30. The through slit may be defined as a space between a pair of inserts 31 selectively fixing the memory module 11. In a state in which the insert 31 is mounted, an upper side of the memory module 11 may be exposed on one surface of the test tray 30 and a lower side may be exposed on a back surface of the test tray 30. A predetermined disposition pattern of the memory module array 10 may be set to match a socket formed in the tester 330. In other words, a pattern in which the memory module 11 is disposed may correspond to a pattern of a plurality of sockets formed in the tester 330.

Figure 3:
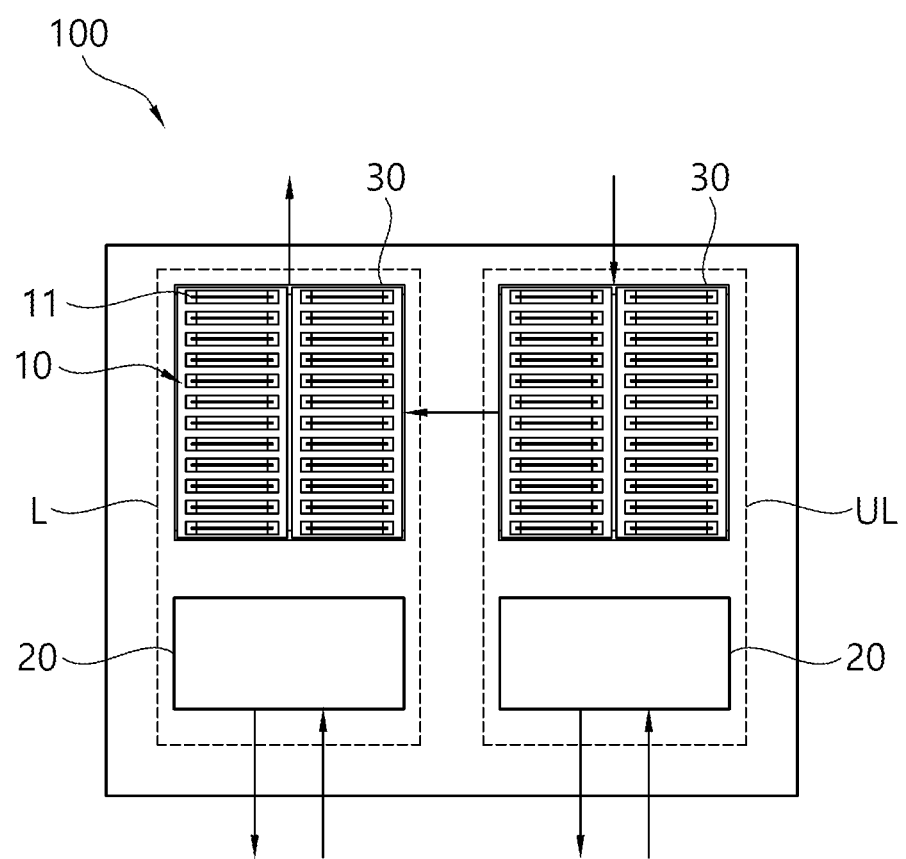
FIG. 3 is a diagram conceptually illustrating a handler according to an embodiment of the present disclosure.

FIG. 3 is a diagram conceptually illustrating a handler according to an embodiment of the present disclosure. As illustrated in FIG. 3, the test tray 30 and a user tray 20 may be disposed in a space inside the handler 100.

The user tray 20 may be a tray for carrying in and out of the memory module 11. The user tray 20 may have memory modules 11 disposed for performing a mounting test. In addition, the memory modules 11 that have completed mounting tests may be classified and disposed on the user tray 20 according to test results. A description thereof will be described later with a description of a loading site L and an unloading site UL.

The space inside the handler 100 may be divided into the loading site L and the unloading site UL according to the purpose. The loading site L may be a space for loading the memory module 11 of the brought user tray 20 on the test tray 30 for a mounting test.

In contrast, the unloading site UL may be a space for unloading the memory module 11 that has completed a mounting test on the user tray 20 carried out to the outside. In this connection, the memory modules 11 may be classified and disposed on the user tray 20 according to the results of the mounting test. For example, the memory modules 11 may be classified as normal, defective, and need to be retested, and the memory modules 11 having each different result may be disposed in each different area on the user tray 20.

The test tray 30 that has been unloaded at the unloading site UL may move to the loading site L, and the memory module 11 may be loaded again. In other words, the test tray 30 may circulate inside the system 1 for a memory module mounting test and may load or unload the memory module 11.

To this end, the handler 100 may include at least one hand (not shown) that picks and places the memory module 11. Preferably, the handler 100 may include a first hand (not shown) in charge of transferring the memory module 11 at the loading site L and a second hand (not shown) in charge of transferring the memory module 11 at the unloading site UL.

On one side of the loading site L and one side of the unloading site UL, the transfer 200 is configured to enter the handler 100 and hold and/or support the test tray 30. In contrast, the other side of the loading site L and the other side of the unloading site UL may be configured to exchange the user tray 20 with the outside. For example, the user tray 20 may be automatically transferred by a robot such as an automated guided vehicle (AGV) or manually transferred by a user.

Figure 4:
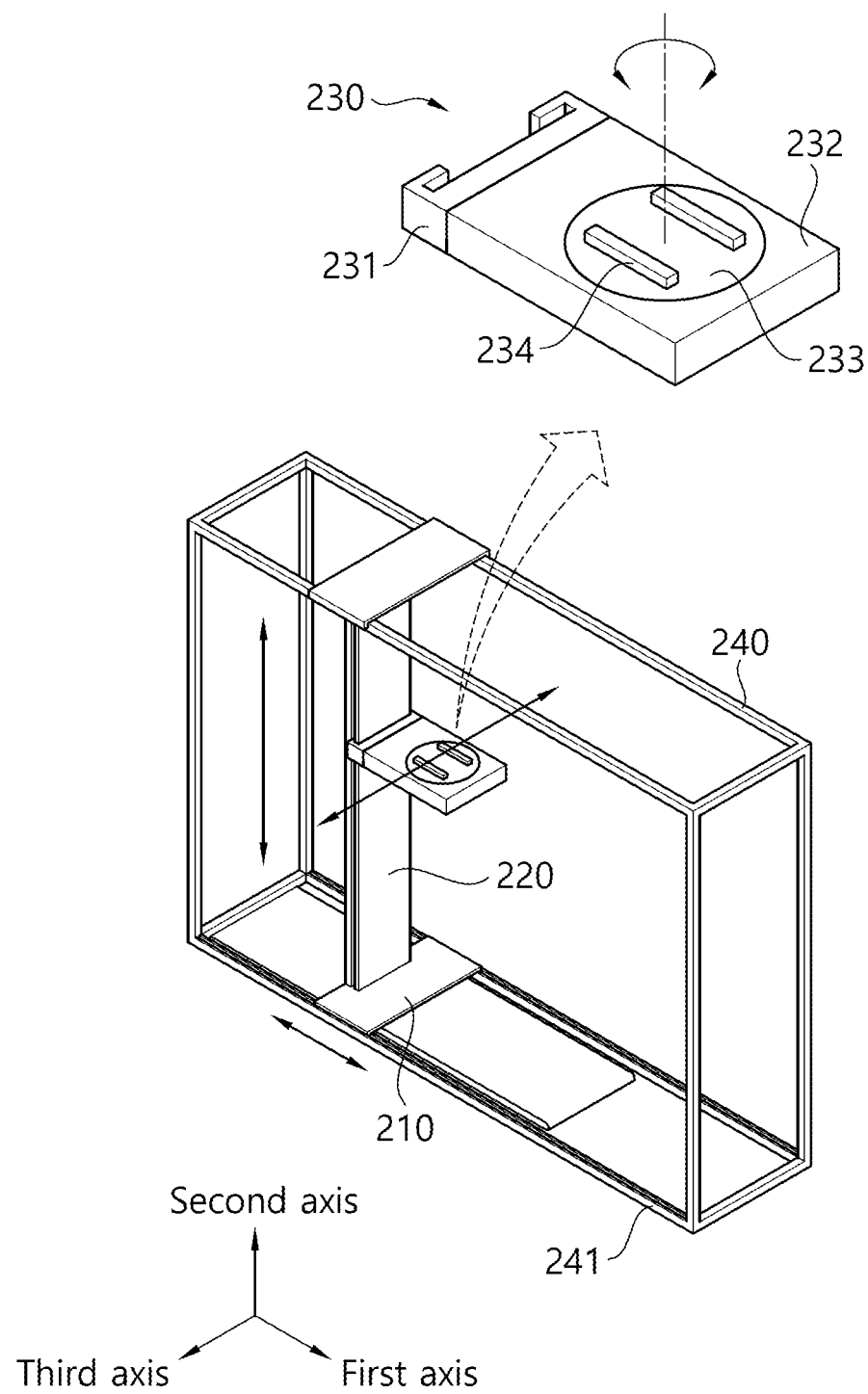
FIG. 4 is a diagram schematically representing a transfer according to an embodiment of the present disclosure.

FIG. 4 is a diagram schematically representing a transfer according to an embodiment of the present disclosure. As illustrated in FIG. 4, the transfer 200 according to an embodiment of the present disclosure may include a frame 240, a transfer plate 210, a pillar member 220, and a support portion 230.

The frame 240 defines an area in which the transfer 200 may move, and is configured to support the transfer 200 as a whole. Specifically, the frame 240 may have a substantially rectangular parallelepiped shape having a length in a first axis direction, a height in a second axis direction, and a width in a third axis direction.

The rail 241 may configure a portion of the frame 240 and may be a member for first axis linear movement of the support portion 230. To this end, the rail 241 may be formed to extend along a first axis. Illustratively, the rails 241 are provided as a pair and may configure a lower portion of the frame 240.

The transfer plate 210 may be configured to be movable on the frame 240 based on the first axis. The transfer plate 210 may be coupled to the rail 241 by a linear guide, and may be moved along the first axis by a first axis driving portion 251 (see FIG. 5), which will be described later.

A pillar member 220 may be configured to be supported by the transfer plate 210 and extend in a vertical direction. The pillar member 220 may be formed so that the support portion 230 may move in a vertical direction (a second axis direction).

The support portion 230 may be configured to support or grip the test tray 30 (see FIGS. 2 and 3). In addition, the test tray 30 may be configured to be linearly movable along a predetermined length in a third axis direction so as to be exchanged with the handler 100 or the tester 300.

Accordingly, the transfer 200 enters the inside of the handler 100 or the tester 300, seats the test tray 30 and exits, or enters the inside of the handler 100 or the tester 300 and removes the test tray 30.

In addition, the support portion 230 may be configured to rotate the supported test tray 30. More specifically, the support portion 230 may rotate the test tray 30 using a second axis as a rotation axis.

The support portion 230 may include a lower configuration of a slide member 231, a support plate 232, a rotation plate 233, and a protruding/retracting member 234.

One side of the slide member 231 may be slidably coupled to the pillar member 220 and may be moved up and down along the second axis direction. The support plate 232 may be movably coupled to the other side of the slide member 231 in the third axis direction. The rotation plate 233 may be coupled to an upper surface of the support plate 232 and may be rotatably formed around the second axis.

The protruding/retracting member 234 may rotate together with the rotation plate 233 and may be formed to be protruding and retracting on the rotation plate 233. The protruding/retracting member 234 may be configured to directly grip or support the test tray 30.

For example, when the test tray 30 is carried out of the handler 100, the support portion 230 may enter a lower side of the test tray 30 in a state in which the protruding/retracting member 234 is inserted into the rotation plate 233. After the support portion 230 enters, the protruding/retracting member 234 may protrudes to grip or support the test tray 30.

In addition, for example, when the support portion 230 has the test tray 30 seated in the tester 330, the support portion 230 may hand over the test tray 30 to a transfer device (not shown) provided in the tester 330. Thereafter, the protruding/retracting member 234 may be inserted into the rotation plate 233 again. Herein, the transfer device may be implemented in various configurations. For example, the transfer device may take over the test tray 30 by being positioned between a pair of protruding/retracting members 234 at a lower side of the test tray 30 as the support portion 230 enters the seating position. Alternatively, the transfer device may be configured as a separate third hand (not shown).

However, the aforementioned configuration of the transfer 200 is exemplary, and the transfer 200 is capable of 6-direction movement of the first to third axes and rotational movement around the second axis. If it is a configuration capable of transporting the test tray 30, it may be implemented differently from the aforementioned example.

Figure 5:
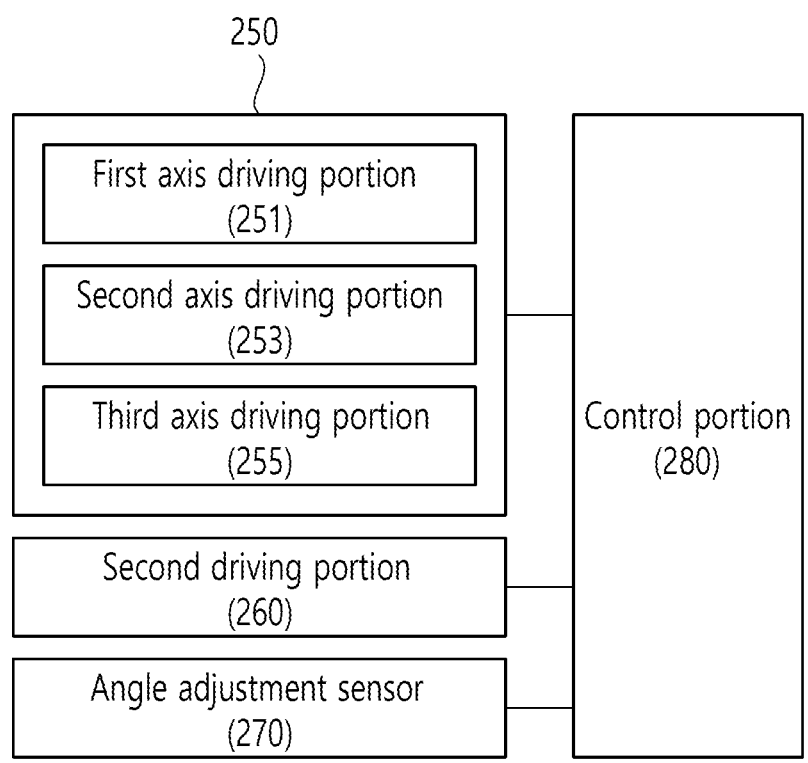
FIG. 5 is a block diagram illustrating a transfer and a control portion according to an embodiment of the present disclosure.

FIG. 5 is a block diagram illustrating a transfer and a control portion according to an embodiment of the present disclosure.

As illustrated in FIG. 5, in order to implement movement of the transfer, the transfer 200 may include a first driving portion 250, a second driving portion 260, and an angle adjustment sensor 270.

The first driving portion 250 may be a driving unit for moving the transfer from an initial position to a seating position. For example, the first driving portion 250 may be implemented using various conventional configurations such as a piston-cylinder mechanism and a motor.

The first driving portion 250 may be divided into a first axis driving portion 251, a second axis driving portion 253, and a third axis driving portion 255 according to the direction in which the support portion 230 is moved.

The first axis driving portion 251 may be a driving unit capable of moving the transfer plate 210 in both directions (front and rear directions) along the first axis. The second axis driving portion 253 may be a driving unit capable of moving the slide member 231 in both directions (up and down directions) along the second axis direction. In this regard, the third axis driving portion 255 may be a driving unit capable of moving the support plate 232 in both directions (left and right directions) along a third axis.

The second driving portion 260 may be a driving unit capable of rotating the rotation plate 233 around the second axis as a central axis. The second driving portion 260 may be implemented based on a motor, for example.

When the first axis driving portion 251, the second axis driving portion 253, the third axis driving portion 255, and the second driving portion 260 are implemented based on a motor, the first axis driving portion 251, the second axis driving portion 253, the third axis driving portion 255, and the second driving portion 260 may further include an encoder capable of understanding a movement amount and/ or a rotation amount.

More specifically, the encoder may acquire sensing information by sensing the rotational speed and direction of the motor. The sensing information may be used by a control portion 280 to understand the coordinates of the first axis, the second axis, and the third axis of the support portion 230 and to understand the rotational state of the rotation plate 233.

The angle adjustment sensor 270 is a configuration for understanding the adjustment angle for the rotation plate 233. Herein, the adjustment angle may mean an angle at which the rotation plate 233 needs to be rotated to arrange the test tray 30 supported by the support portion 230 with the socket of the tester 330. A detailed description of the adjustment angle will be described later.

The control portion 280 may be a control unit that controls the first driving portion 250 and the second driving portion 260 respectively. Under the control of the control portion 280, the support portion 230 make take over the test tray 30 (see FIGS. 2 and 3) in its initial position. In addition, under the control of the control portion 280, the support portion 230 may be moved to a seating position and hand over the test tray 30 to the tester 330.

Figure 6:
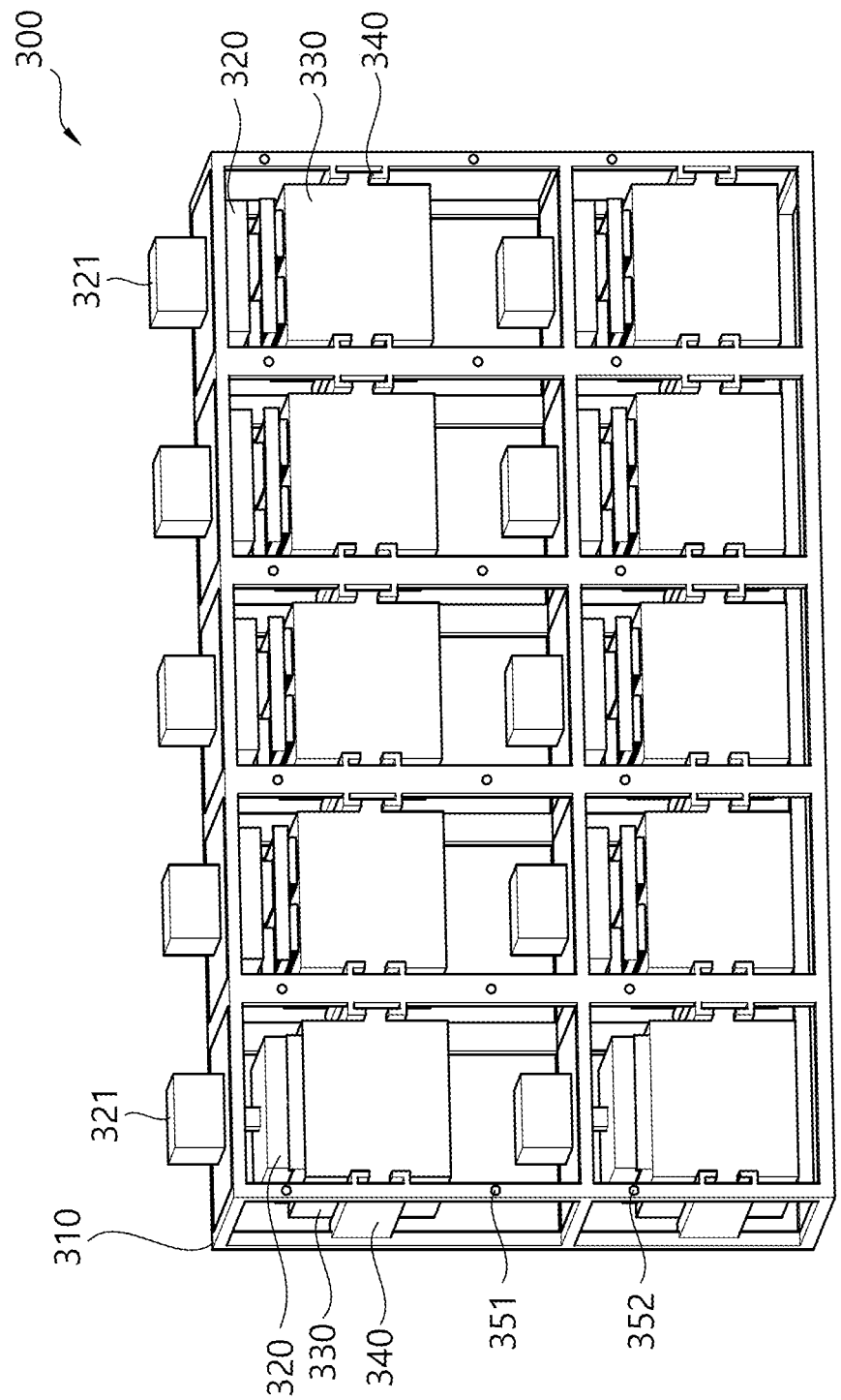
FIG. 6 is a perspective view of a tester array according to an embodiment of the present disclosure.

FIG. 6 is a perspective view of a tester array according to an embodiment of the present disclosure.

As illustrated in FIG. 6, the tester array 300 may include a tester rack 310 on which a plurality of testers 330 are mounted. The tester rack 310 may be a skeleton structure on which a plurality of testers 330 and a plurality of mounters 320 are mounted.

The mounter 320 may be mounted on the tester rack 310 so as to be positioned on an upper side of each tester 330. In addition, the mounter 320 may be able to perform a press operation by lowering an lower end while an upper end is fixed to the tester rack 310. This press operation may be implemented by a mounter driving portion 321. The mounter driving portion 321 may be implemented with various conventional drive units that allow the mounter 320 to perform a press operation.

Coordinate identifiers 351 and 352 may be positioned in the tester rack 310. The coordinate identifiers 351 and 352 may be positioned to understand a seating position and an adjustment angle for each tester 330.

The coordinate identifiers 351 and 352 may be implemented in various configurations according to a coordinate identification method of the transfer 200. The positions of the coordinate identifiers 351 and 352 may be set to guide a first axis coordinate, a second axis coordinate, or a third axis coordinate of the tester 330, or to guide the arrangement state of the tester 330 (or the socket of the tester). Hereinafter, for convenience of explanation, the area where the coordinate identifiers 351 and 352 are positioned is referred to as a setting area.

In addition, in the following description, for convenience of explanation, an example that the angle adjustment sensor 270 recognizes all arrangement states of the first axis coordinate, the second axis coordinate, the third axis coordinate, and the tester 330 as an example, but the present disclosure is not limited thereto.

For example, at least one of the arrangement states of the first axis coordinate, the second axis coordinate, the third axis coordinate, and the tester 330 may be sensed by any one sensor, or each sensor may be in charge of sensing.

The coordinate identifiers 351 and 352 may be divided into a length coordinate identifier 351 and a layer number coordinate identifier 352 according to an object to be identified. The length coordinate identifier 351 may be positioned along the same second axis coordinate as the initial position. The layer number coordinate identifier 352 may be positioned along the same second axis coordinate as the seating position.

Figure 7:
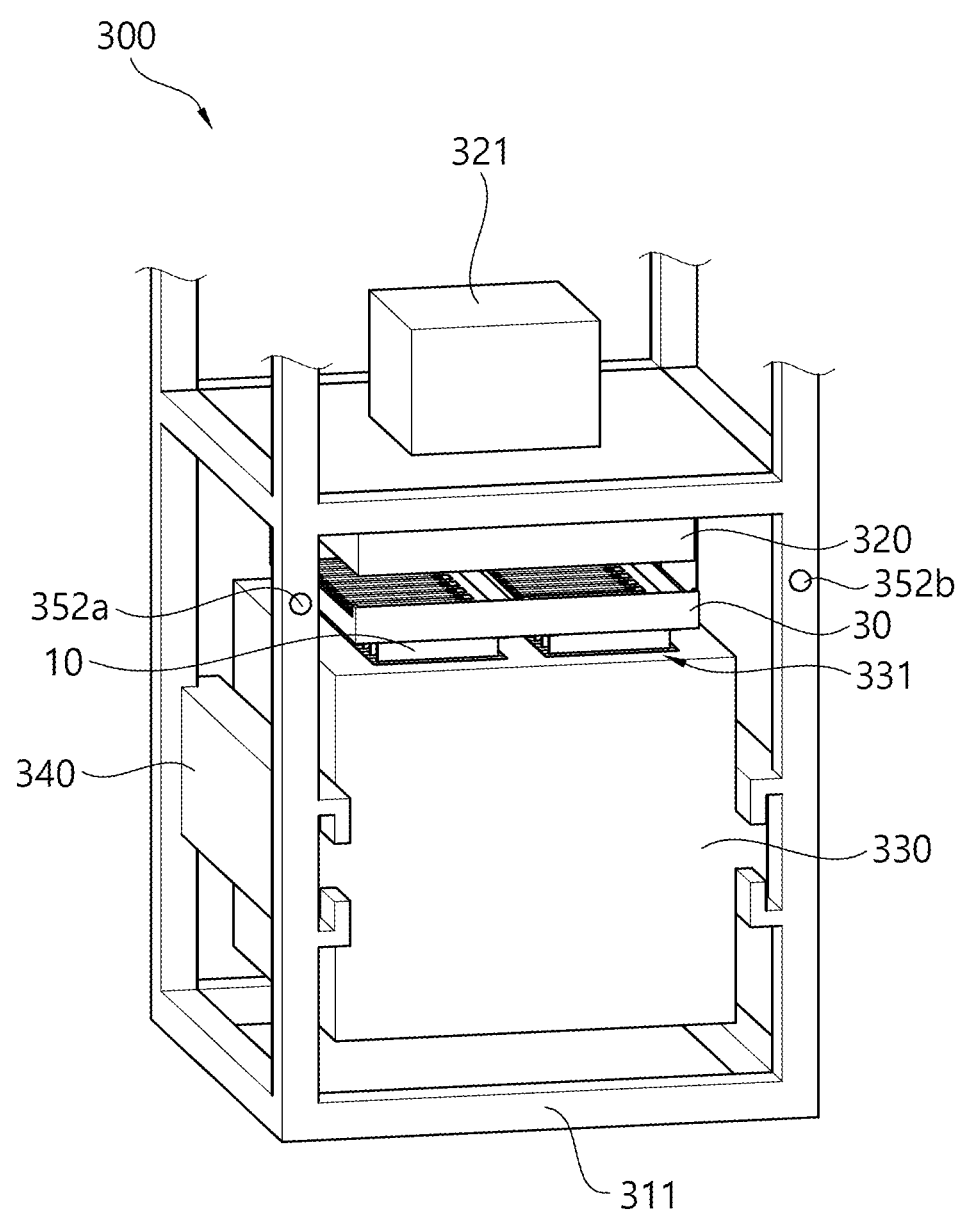
FIG. 7 is an enlarged view of a tester and a tester rack according to an embodiment of the present disclosure.

Hereinafter, with reference to FIG. 7, the tester and its support structure will be further described. FIG. 7 is an enlarged view of a tester and a tester rack according to an embodiment of the present disclosure.

Referring to FIG. 7, the tester rack 310 (see FIG. 6) may be divided into a plurality of support racks 311. For example, the tester rack 310 may be formed by arranging a plurality of support racks 311 along the first axis direction.

Two layer number coordinate identifiers 352a and 352b may be positioned adjacent to the socket 331 in the support rack 311. The setting area of the layer number coordinate identifiers 352a and 352b may have the same second axis coordinate as the second axis coordinate of the seating position of the corresponding tester 330.

The tester 330 may be connected to a linear guide 340 so as to move in a plane direction on the support rack 311. Accordingly, since the tester 330 may be taken out as needed, accessibility during maintenance may be improved.

Since the tester rack 310 may be formed by connecting a plurality of support racks 311, human errors may occur in the process of arranging the support racks 311, or a phenomenon in which the support rack 311 is distorted with respect to another support rack 311 may occur due to vibration caused by repeated tests or for various reasons.

Figure 8:
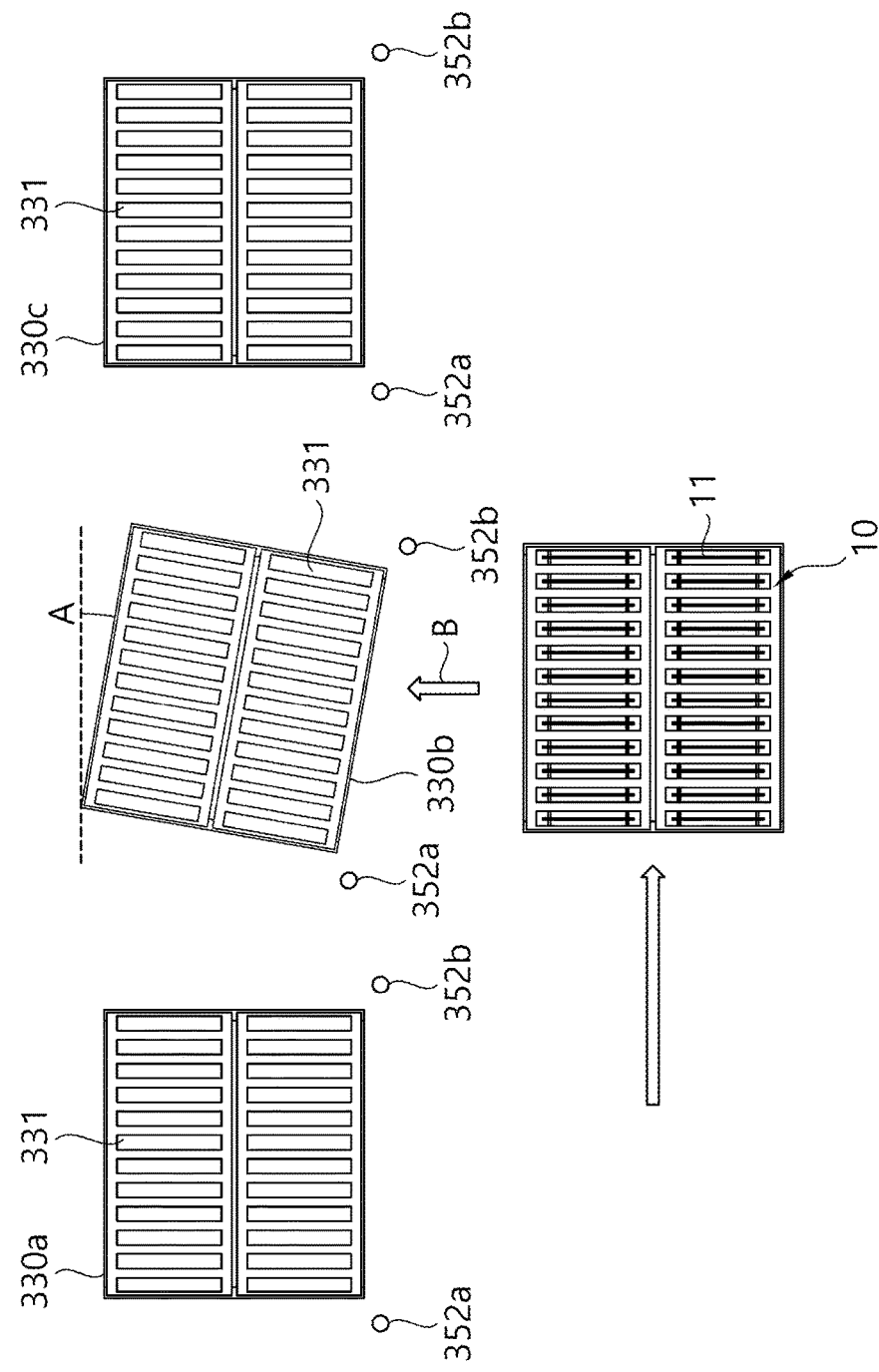
FIG. 8 is a diagram representing that testers are not arranged with respect to neighboring testers.
Figure 9:
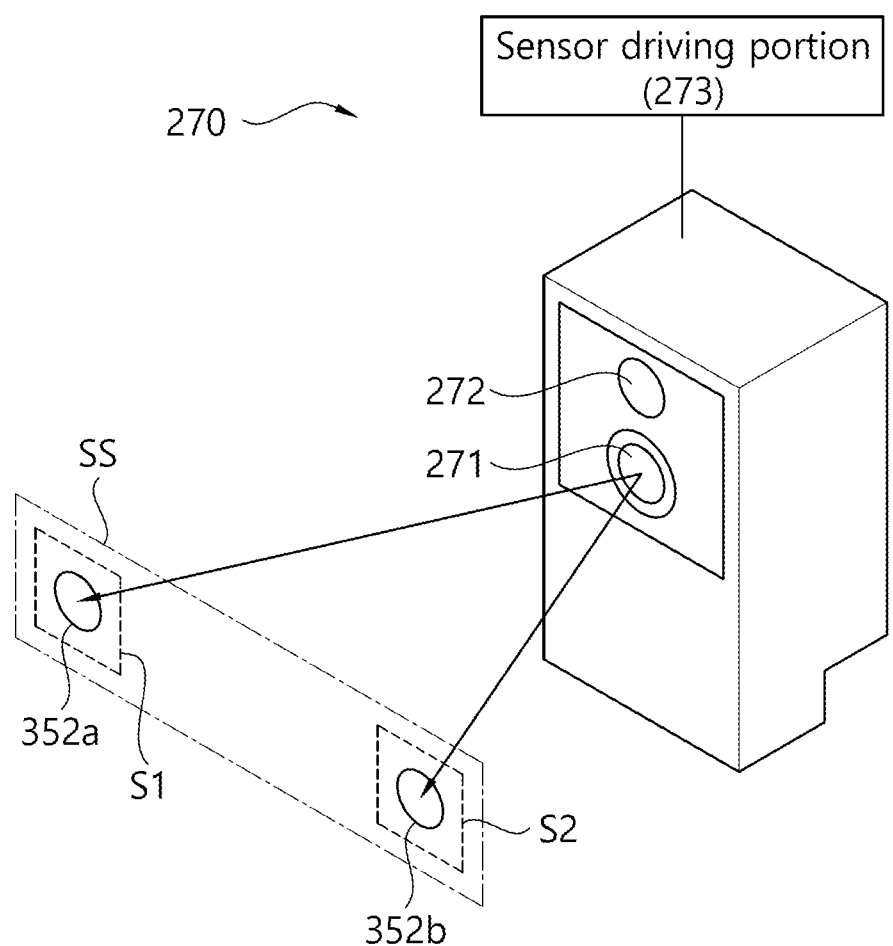
FIG. 9 is a diagram for explaining that an angle adjustment sensor understands an adjustment angle.

Hereinafter, a function of seating the test tray 30 by compensating for such a distortion will be described with reference to FIGS. 8 and 9. FIG. 8 is a diagram representing that testers are not arranged with respect to neighboring testers. FIG. 9 is a diagram for explaining that an angle adjustment sensor understands an adjustment angle.

When the support rack 311 (see FIG. 7) is twisted, as illustrated in FIG. 8, a specific tester 330b may be twisted at a predetermined angle compared to neighboring testers 330a and 330c. However, the details illustrated in FIG. 8 are somewhat exaggerated to aid understanding, and in reality, the distorted angle may be very small.

In this connection, when the test tray is moved and mounted in the direction of the arrow illustrated in FIG. 8 to the specific tester 330b, the memory module array 10 and the socket 331 may not be matched, and thus the test tray 30 may not be mounted on the tester 330b or the memory module 11 may be damaged.

When the support rack 311 is distorted, the layer number identifiers 352a and 352b for guiding the corresponding tester 330b may also be distorted unlike the other testers 330a and 330c. More specifically, an imaginary line connecting the layer number identifiers 352a and 352b of the untwisted testers 330a and 330c may be substantially perpendicular to an entry direction B (or the third axis direction). In this regard, the angle formed by the imaginary line connecting the layer number identifiers 352a and 352b of the twisted tester 330b and the entry direction B (or the third axis direction) may generate a difference by the original angle and the distorted angle (A).

Accordingly, when a degree of distortion (A) of the layer number identifiers 352a and 352b is understood, it is possible to rotate the test tray 30 by the degree of distortion (A) and then mount the same on the tester 330b.

When the description continues with reference to FIG. 9, the angle adjustment sensor 270 may recognize the layer number identifiers 352a and 352b to understand the degree of distortion, and based thereon, it is possible to understand the adjustment angle. To this end, the angle adjustment sensor 270 may include lower configurations of a measurement wave transmitter 271, a measurement wave receiver 272, and a sensor driving portion 273.

The measurement wave transmitter 271 may be disposed in the housing so as to face the front of the housing (unnumbered) of the angle adjustment sensor 270. The measurement wave transmitter 271 may be provided to transmit a measurement wave capable of measuring a distance. Hereinafter, an example in which the measurement wave transmitter 271 transmits infrared rays to the outside will be described, but the present disclosure is not limited thereto.

The measurement wave receiver 272 is a unit that receives a measurement wave reflected from an external object. The measuring wave receiver 272 may also be positioned so as to face the front of the housing as well. The angle adjustment sensor 270 may be configured to understand a distance to an external object based on information received from the measurement wave receiver 272.

The sensor driving portion 273 is a driving unit that adjusts the direction in which the housing faces. For example, the sensor driving portion 273 may be provided with a motor capable of rotating the housing of the angle adjustment sensor 270.

The sensor driving portion 273 may operate under the control of the control portion 280 (see FIG. 5). The control portion 280 may control the sensor driving portion 273 to adjust the viewing direction of the angle adjustment sensor 270.

For example, the control portion 280 may control the sensor driving portion 273 to rotate the angle adjustment sensor 270 in a large angular range. In this connection, the angle adjustment sensor 270 may acquire distance information about the layer number identifiers 352a and 352b by scanning an area SS including both the layer number identifiers 352a and 352b. In this connection, the area SS may be set in consideration of the average degree of distortion.

As another example, the control portion 280 may control the sensor driving portion 273 to scan an area including each of the layer number identifiers 352a and 352b. In this connection, the angle adjustment sensor 270 performs two scans in two different angular ranges (a first angular range and a second angular range).

For example, rotation of the first angular range by the sensor driving portion 273 may cause the angle adjustment sensor 270 to scan a first area S1. The first area S1 may be an area with a high possibility that any one layer number identifier 352a, preset in consideration of the average degree of distortion, exists.

In this regard, rotation of the second angular range by the sensor driving portion 273 may cause the angle adjustment sensor 270 to scan a second area S2. The second area S2 may be an area with a high possibility that any one layer number identifier 352b, preset in consideration of the average degree of distortion, exists.

The angle adjustment sensor 270 may acquire distance information for the layer number identifier 352a in the first area S1 and acquire distance information for the layer number identifier 352b in the second area S2.

The angle adjustment sensor 270 that acquires the distance information may calculate an adjustment angle based on the distance to each of the layer number identifiers 352a and 352b. For this calculation, the angle adjustment sensor 270 may include a calculation unit that calculates the adjustment angle based on the distance to each of the layer number identifiers 352a and 352b.

The reason why the adjustment angle may be understood based on the distance to each of the layer number identifiers 352a and 352b (see FIG. 8) is that when the testers 330a and 330c are properly disposed, the distance between the angle adjustment sensor 270 and the layer number identifiers 352a and 352b before entering each tester (the state in which the support portion moves only to the first and second axes) is always the same as a constant value or within an error range. In other words, this may be because the distance from the angle adjustment sensor 270 to the layer number identifiers 352a and 352b for properly disposed testers 330a and 330c and the distance to the layer number identifiers 352a and 352b for the distorted tester 330b are different from each other.

A method of acquiring a distance to the layer number identifiers 352a and 352b by the angle adjustment sensor

270 scanning an area may vary depending on the type of the layer number identifiers 352*a* and 352*b*.

For example, the layer number identifiers 352*a* and 352*b* may protrude or be recessed in the support rack 311. In this connection, the angle adjustment sensor 270 may be configured to measure distance information for all scan areas.

Figure 10:
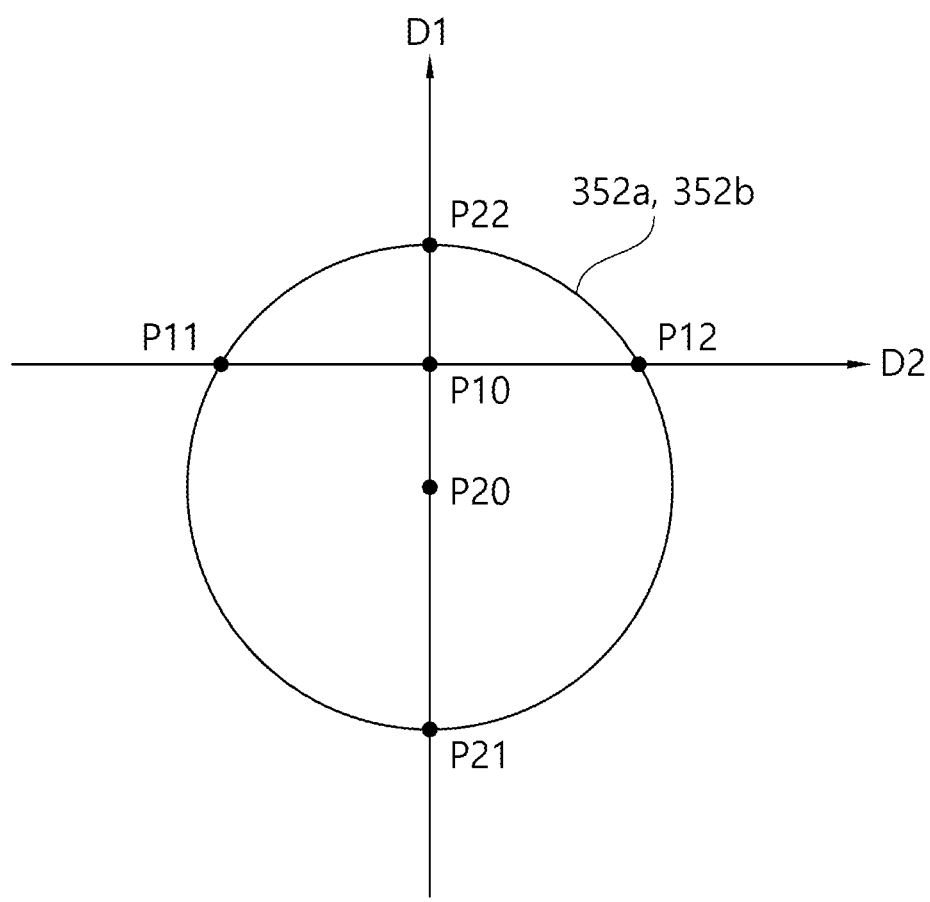
FIG. 10 is a diagram representing an example of a method for recognizing a layer number identifier by an angle adjustment sensor.

Continuing the description using FIG. 10, FIG. 10 is a diagram representing an example of a method for recognizing a layer number identifier by an angle adjustment sensor.

In this connection, the control portion 280 may control the sensor driving portion 273 and/or the first axis driving portion 251 so that the angle adjustment sensor 270 scans the area including the layer number identifiers 352*a* and 352*b* in a direction D1 parallel to the first axis.

When the layer number identifiers 352*a* and 352*b* protrude or be recessed, the distance to the layer number identifiers 352*a* and 352*b* in the distance information of the scanned area may have a large difference from the distance to its surroundings. Accordingly, a critical difference in distance values occurs between the layer number identifiers 352*a* and 352*b* and neighboring boundaries P11 and P12.

After scanning the external object in the first axis direction D1, the angle adjustment sensor 270 may understand the coordinates of the boundaries P11 and P12 and a first axis center coordinate P10 at the center of the boundaries P11 and P12. The first axis center coordinate P10 may be acquired by averaging the first axis coordinates of the boundaries P11 and P12.

Thereafter, the angle adjustment sensor 270 may transfer information about the center coordinate P10 to the control portion 280. Thereafter, the control portion 280 may control the sensor driving portion 273 and/or the second axis driving portion 253 so as to scan the area including the layer number identifiers 352*a* and 352*b* in the direction D2 parallel to the second axis passing through the first axis center coordinate P10.

The angle adjustment sensor 270, similarly to the case of the first axis center coordinate P10, understands the coordinates of the boundaries P21 and P22 and uses the same to understand the second axis center coordinate P20. Then, in the process of scanning along the direction D2, the angle adjustment sensor 270 may determine a distance value for the second axis center coordinate P20 as a distance value for the corresponding layer number identifiers 352*a* and 352*b*.

In the case of scanning a large area (SS; see FIG. 9) in the above example, two first axis center coordinates are displayed, which are respectively for different layer number identifiers 352*a* and 352*b*. In this connection, the angle adjustment sensor 270 may acquire distance information for each layer number identifier 352*a* and 352*b* by performing a D2-direction scan at each first axis center coordinate.

As another example, the layer number identifiers 352*a* and 352*b* may be provided in the form of optically recognizable markers. Correspondingly, the angle adjustment sensor 270 may further include an additional device (hereinafter referred to as a marker recognizing unit) for recognizing the existence of a marker according to light reflected from the marker.

For example, the marker may be a barcode and the angle adjustment sensor 270 may have a barcode reader. Alternatively, the marker may be a reflector, and the angle adjustment sensor 270 may have a light source and an optical receiver for receiving light reflected from the light source.

When the layer number identifiers 352*a* and 352*b* are optically recognizable markers, the angle adjustment sensor 270 may omit distance measurement for all scanned areas. In this connection, the angle adjustment sensor may use the marker recognizing unit when scanning the aforementioned area. In this connection, when the marker recognizing unit finds a marker during the scanning process, the distance to the layer number identifiers 352*a* and 352*b* may be understood by measuring the distance to the point where the marker is recognized.

Continuing the description with reference to FIG. 8, as in the aforementioned method, when the angle adjustment sensor 270 understands the distance to the layer number identifiers 352*a* and 352*b*, respectively, the degree of distortion A of the tester 330*b* based thereon may be understood. The angle adjustment sensor 270 may transmit information about an adjustment angle to the control portion 280 by setting the angle at which the tester 330*b* is distorted as the adjustment angle. When receiving information about the adjustment angle, the control portion 280 may control the second driving portion to rotate the rotation plate 233 (see FIG. 4) by an adjustment angle. Thereafter, the control portion may control the third axis driving portion to move the support plate 232 (see FIG. 4) in the third axis direction. When the movement in the third axis direction is completed, the test tray 30 (see FIG. 8) may enter a state arranged in the seating position of the distorted tester 330*b*. In this connection, an entry in an arranged state may be a state in which the memory module may enter the socket without damage, and may mean that the projected memory module and the socket are matched when the memory module is projected onto the socket in a seating position.

Figure 11:
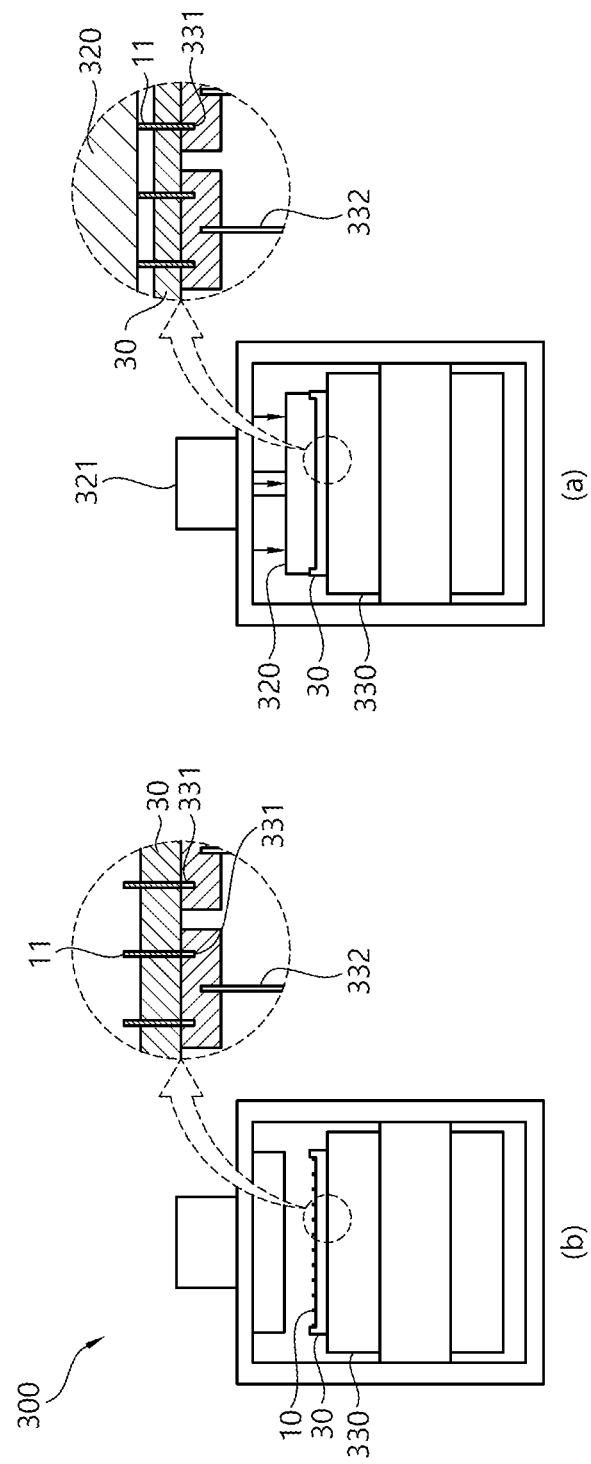
FIG. 11 is a diagram representing mounting of a memory module array in a socket.

Hereinafter, referring to FIG. 11, mounting the memory module array to the socket after being entered in the arranged state will be described. FIG. 11 is a diagram representing mounting of a memory module array in a socket.

When the adjustment angle is adjusted and the test tray 30 is transferred to the seating position in a state where the socket 331 is arranged and the memory module array is arranged, a state as shown in FIG. 11(*b*) may be obtained.

FIG. 11(*b*) may be a state in which the test tray 30 is seated in the seating position of the tester 330 after the transfer is completed to the tester 330. In this state, each memory module 11 may be seated on an upper portion of the socket 331.

Thereafter, as shown in FIG. 11(*a*), when the mounter 320 descends and presses the memory module 11, each memory module 11 may be inserted into the socket 331 and electrically connected to a motherboard 332.

Thereafter, the tester 330 may perform a test on the memory module 11 according to a predetermined algorithm.

Figure 12:
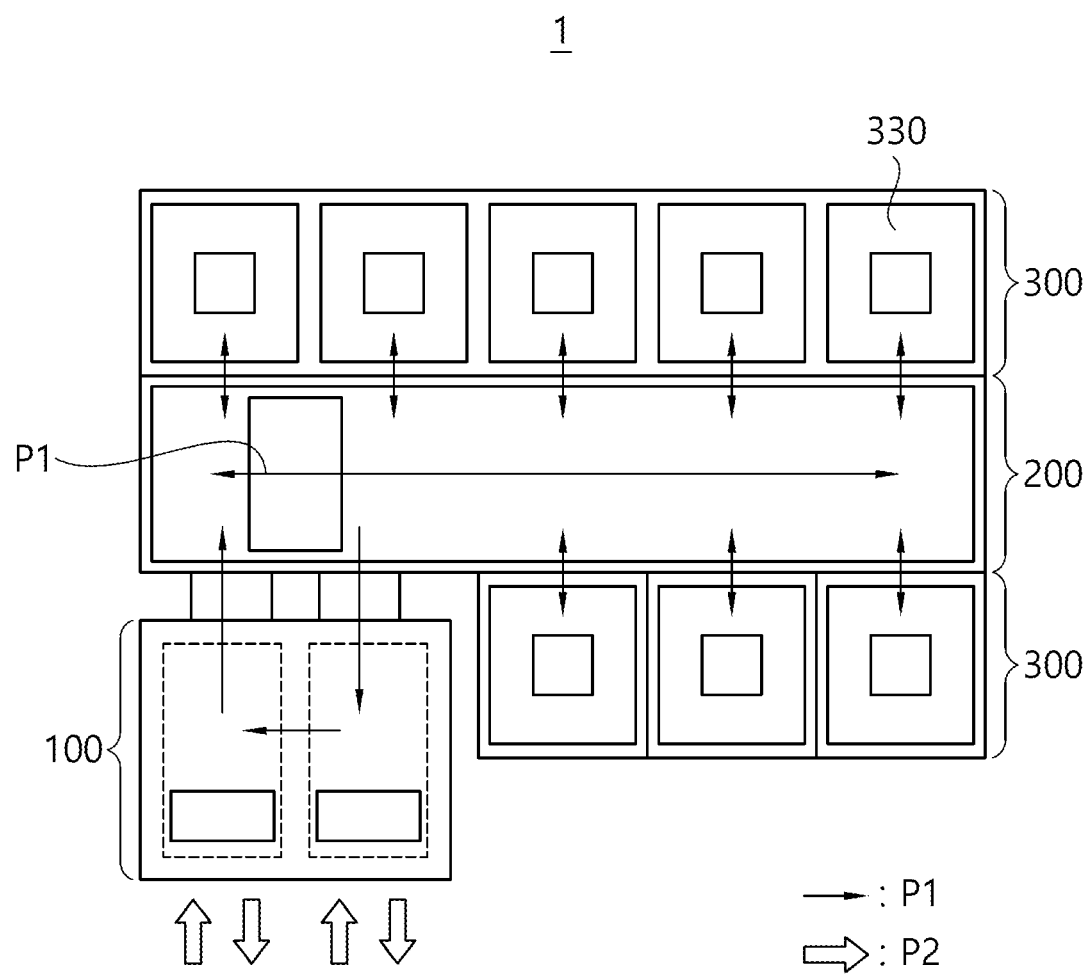
FIG. 12 is a diagram conceptually illustrating a system for a memory module mounting test according to an embodiment of the present disclosure.

FIG. 12 is a diagram conceptually illustrating a system for a memory module mounting test according to an embodiment of the present disclosure.

As illustrated in FIG. 12, tester arrays 300 may be arranged on both sides of the transfer 200. Specifically, the tester array 300 may be arranged on both sides along the longitudinal direction of the rail 242 (see FIG. 4).

The control portion 280 may control the transfer 200 so that the test tray 30 is sequentially mounted on each tester 330 included in the tester array 300. The transfer 200 may sequentially supply the test trays 30 to each tester 330 under the control of the control portion 280, collect the test trays 30 on which the test is completed, and dispose the same in the handler.

In FIG. 12, an arrow P1 indicates that the test tray is transported to each tester 330, and an arrow P2 indicates that a user tray is carried in for testing or a user tray for which a test is completed is carried out.

The system 1 for the memory module mounting test according to an embodiment of the present disclosure has a benefit in that the test tray may be stably mounted even in the long tester array 300 by the aforementioned adjustment angle arrangement function.

Specifically, as the length of the tester array 300 increases, tolerances accumulate, disposition errors accumulate, or, due to various reasons, the disposition state of the socket may be distorted as shown in FIG. 8.

Even in this case, an embodiment of the present disclosure has the benefit of being able to properly mount the test tray on the tester by automatically teaching the mounting thereof without having to reinstall to rearrange the tester array 300 or separately control the transfer 200.

Figure 13:
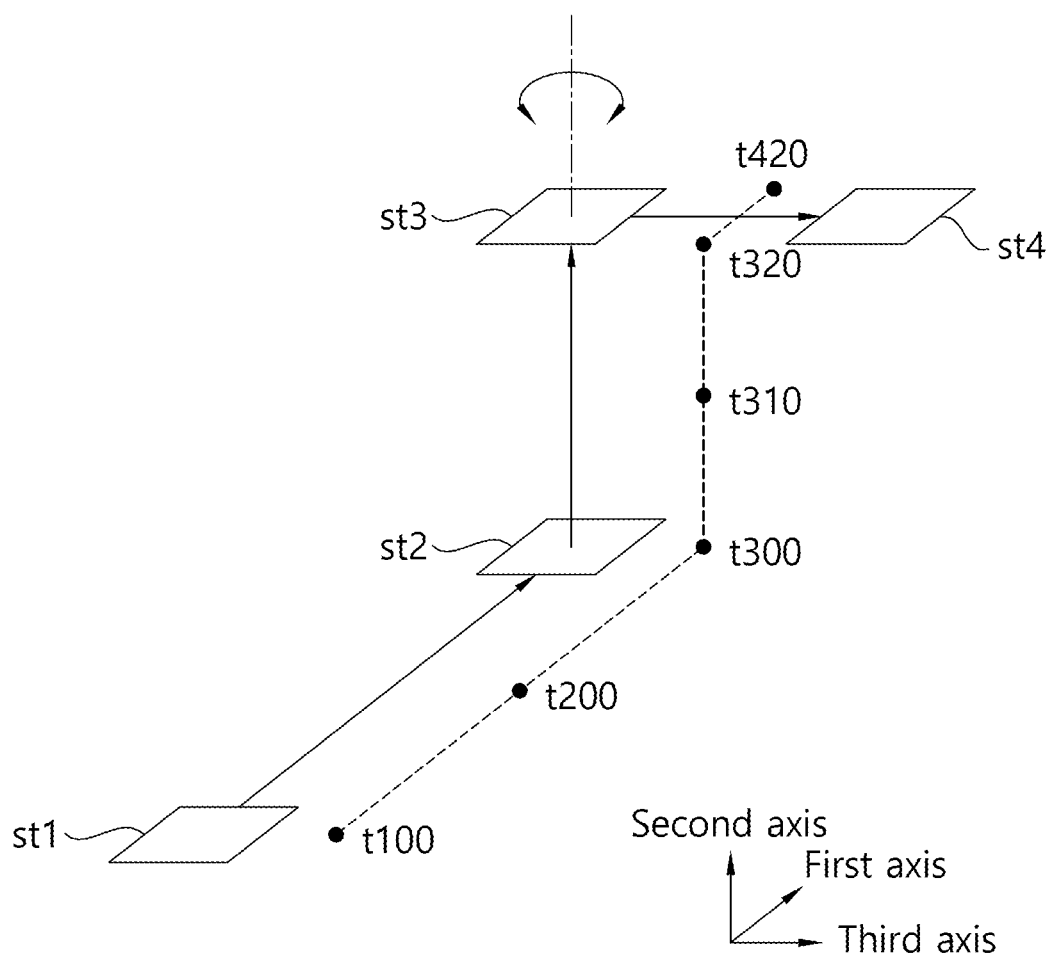
FIG. 13 is a diagram conceptually representing that a transfer according to an embodiment of the present disclosure transfers a test tray from an initial position to a seating position.

Continuing the description with reference to FIG. 13, FIG. 13 is a diagram conceptually representing that a transfer according to an embodiment of the present disclosure transfers a test tray from an initial position to a seating position.

In FIG. 13, the test trays transferred to the corresponding positions are marked with st1 to st4. In addition, the coordinate identifiers disposed on the tester rack 310 (see FIG. 6) are marked with t100, t200, t300, t410, t320, and t420. The transfer may recognize the coordinate identifiers t100, t200, t300, t410, t320, and t420 to understand the displacement for the current position.

In this connection, t100, t200, and t300 may be length coordinate identifiers for guiding the displacement of the first axis coordinates. In this regard, t320 and t420 may be coordinate identifiers positioned on the support rack 311 (see FIG. 7) of a specific tester on which the test tray is to be seated. In addition, t310 may be a coordinate identifier positioned on the support rack of a tester positioned on a lower layer for a specific tester.

Hereinafter, it is assumed that the angle adjustment sensor is disposed at the front end of the test tray based on the first axis direction, but it may be changed in various embodiments. In addition, hereinafter, the transfer will be described as searching for a seating position st4 for a specific tester based on the coordinate identifier t320 relatively close to an initial position st1, but similarly, it may be changed in various embodiments as well.

The process of transferring, by the transfer, the test tray to a specific tester may be as follows.

The transfer holding the test tray at the initial position st1 may receive a control signal from the control portion to transfer the test tray to a specific tester. In this connection, the sensor driving portion 273 (see FIG. 9) may adjust the angle adjustment sensor 270 (see FIG. 9) to be parallel to the third axis at the initial position st1 and to face the right side with respect to FIG. 13. This is because the third axis coordinate value of a specific tester is on the right side of FIG. 13.

For example, in this connection, the angle adjustment sensor may look at a plane indicated by the third axis coordinate of the coordinate identifier t320 assigned to a specific tester. More specifically, when the first axis is an X axis, the second axis is a Z axis, the third axis is a Y axis, and the xyz coordinates of t320 are (a, b, c), the angle adjustment sensor may be made to look at the plane Y=c.

Thereafter, the control portion may control the first driving portion to transfer the test tray along the first axis until a length coordinate identifier t300 indicating the same first axis coordinate as the coordinate identifier t320 assigned to a specific tester is recognized.

A method of checking the first axis coordinate and/or the length coordinate identifier t300 for transfer may be to use the numeral of recognized coordinate identifiers. More specifically, a numeral corresponding to an appearance order may be set for each length coordinate identifier. The control portion may transfer the support portion by controlling the first driving portion until coordinate identifiers having the same number as the order of appearance of corresponding length coordinate identifiers are recognized.

For example, in the process of scanning along the first axis by the transfer, the number of appearances of protruding or recessed portions (the number of times of appearances of areas having a critical distance difference compared to other portions), the number of times the barcode reader recognizes barcodes, and/or the number of times the light irradiated from the light source (for example, LED) is reflected by the reflector and the optical receiver recognizes the reflected light may indicate the aforementioned order of appearance.

Alternatively, as another example, the control portion may understand the coordinates of the current support portion based on the barcode recognized by the transfer. In this connection, the barcode may be recognized by a barcode reader installed in the transfer, and may include information about the first axis coordinate and/or the second axis coordinate of the corresponding position.

When the length coordinate identifier t300 for the primary transfer of the support portion is recognized, the control portion may complete the movement of the first axis at the corresponding position st2. Thereafter, the transfer may lift the test tray along the second axis until the coordinate identifier t320 assigned to a specific tester is recognized.

When the control portion understands the coordinates to be transferred using the numeral of recognized coordinate identifiers, the second axis coordinate may be understood using the numeral of coordinate identifiers recognized during the process of lifting the transfer (second axis movement process). Understanding the coordinates of the second axis with the numeral of coordinate identifiers may be the same as or similar to that of the first axis.

In this regard, in the case of using a barcode including information on coordinates, the coordinates of the second axis may be checked by recognizing the barcode, similar to the case of the first axis.

When the coordinate identifier t320 assigned to a specific tester is checked, the control portion may temporarily stop the support portion at the corresponding position st3. Thereafter, the transfer may understand the disposition state of a specific tester by driving the angle adjustment sensor. For convenience of description, t320 will be referred to as a reference identifier and t420 as an auxiliary identifier.

When the angle adjustment sensor recognizes the reference identifier t320 and the auxiliary identifier t420 to understand an adjustment angle, the transfer rotates the test tray by the adjustment angle. The method for understanding the adjustment angle has been described, a description thereof will be omitted.

After rotation is complete, the angle adjustment sensor may measure a straight distance to a specific tester. Thereafter, the control portion may add a preset value to the measured straight distance to move the test tray in a straight line. In this connection, the preset value may be a distance from the support rack to an actual seating position st4. In this connection, when the adjustment angle is 0 degrees, the transfer may move the test tray in a direction parallel to the third axis.

When the transfer to the seating position st4 is completed, the transfer may return to the initial position st1 after the test tray is seated in the tester.

Figure 14:
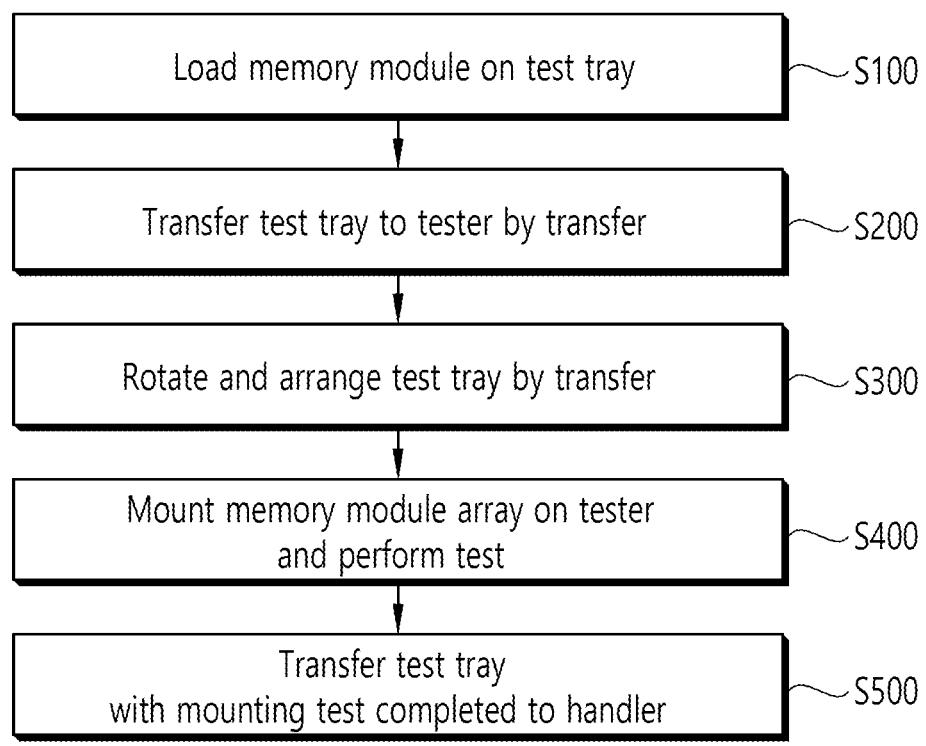
FIG. 14 is a flowchart of a method for a memory module mounting test according to an embodiment of the present disclosure.

Hereinafter, a method for a memory module mounting test according to an embodiment of the present disclosure will be described with reference to FIG. 14. FIG. 14 is a flowchart of a method for a memory module mounting test according to an embodiment of the present disclosure. In order to avoid redundant description, descriptions of common portions in the aforementioned description are omitted.

As illustrated in FIG. 14, the method for the memory module mounting test according to an embodiment of the present disclosure may include: loading a memory module on a test tray (S100); transferring the test tray to a tester by a transfer (S200); rotating and arranging the test tray by the transfer (S300); mounting the memory module array on the tester and performing a test (S400); and transferring the test tray with the mounting test completed to a handler (S500).

The aforementioned system 1 for the memory module mounting test according to an embodiment of the present disclosure may be used in the method for the memory module mounting test according to an embodiment of the present disclosure. Alternatively, the method for the memory module mounting test according to an embodiment of the present disclosure may be implemented by devices other than the aforementioned system 1 for the memory module mounting test according to an embodiment of the present disclosure.

In the loading of the memory module on the test tray (S100), the memory module for performing the mounting test may be loaded on the test tray. A plurality of memory modules may be loaded in a predetermined pattern on the test tray, and the plurality of memory modules may form the memory module array. This loading may be performed by the handler at the initial position.

In the transfer of the test tray to the tester by the transfer (S200), the transfer may transfer the test tray to any one of a plurality of testers. In this stage, the test tray may be transferred from the initial position to the seating position, or the test tray may be transferred to the front of the tester to be transferred. In this connection, a plurality of sockets may be formed in the tester, and the sockets may have a pattern matched with the memory module array.

In the rotation and arrangement of the test tray by the transfer (S300), the transfer may determine the understand an adjustment angle and rotate the test tray by the adjustment angle. When rotated by the adjustment angle, the memory module array loaded on the test tray and the socket can be arranged.

When the test tray is transferred to the seating position in the transfer of the test tray to the tester by the transfer (S200), after the test tray is rotated, the mounting of the memory module array on the tester and performing the test (S400) may proceed.

When the test tray is transferred to the front of the tester in the transfer of the test tray to the tester by the transfer (S200), in this stage, the test tray may be additionally transferred to the seating position after being rotationally arranged.

In the mounting of the memory module array on the tester and performing the test (S400), the arranged memory module may be mounted in the socket and a mounting test may be performed.

In the transfer of the test tray to the handler where the mounting test is completed S500, after the mounting test is completed, the transfer may return to the initial position inside the handler by holding the test tray positioned at the seating position again. After returning to the handler, the memory modules loaded on the test tray may be classified according to the results of the mounting test, and may be organized in a state in which the memory modules may be carried out.

Those skilled in the technical field to which the present disclosure pertains will understand that the present disclosure may be practiced in other detailed forms without departing from the technical spirit or essential features of the present disclosure. Accordingly, it should be understood that the above-described embodiments are exemplary in all aspects rather than being restrictive. The scope of the present disclosure is defined by the following claims rather than by the detailed description of the embodiment. It shall be understood that all modifications and embodiments conceived from the meaning and scope of the claims and their equivalents are included in the scope of the present disclosure.

| Description of Reference Numerals | |
|---|---|
| 1: | System for a memory module mounting test |
| 10: | Memory module array |
| 11: | Memory module |
| 30: | Test tray |
| 31: | Insert |
| 100: | Handler |
| 200: | Transfer |
| 210: | Transfer plate |
| 220: | Pillar member |
| 230: | Support portion |
| 231: | Slide member |
| 232: | Support plate |
| 233: | Rotation plate |
| 234: | Protruding/retracting member |
| 250: | First driving portion |
| 251: | First axis driving portion |
| 253: | Second axis driving portion |
| 255: | Third axis driving portion |
| 260: | Second driving portion |
| 270: | Angle adjustment sensor |
| 271: | Measurement wave transmitter |
| 272: | Measurement wave receiver |
| 273: | Sensor driving portion |
| 280: | Control portion |
| 300: | Tester array |
| 310: | Tester rack |
| 311: | Support rack |
| 320: | Mounter |
| 321: | Mounter driving portion |
| 330: | Tester |
| 331: | Socket |
| 332: | Motherboard |
| 340: | Linear guide |
| 351, 352, 352a, and 352b: | Coordinate identifiers |

What is claimed is:

1. A system for a memory module mounting test with a test tray arrangement function, the system comprising:
a test tray on which a memory module array in which a plurality of memory modules are positioned in a predetermined pattern is loaded;
a tester in which the test tray is able to be seated and a socket corresponding to the predetermined pattern is formed to perform a test on the memory module array;
a transfer for transferring the test tray from an initial position to a seating position where the test tray is seated in the tester; and
a mounter for mounting the memory module array transferred to the seating position in the socket,
wherein the transfer comprises:
a support portion supporting the test tray positioned at the initial position;

a first driving portion transferring the support portion from the initial position to the seating position;

a second driving portion rotating the support portion;

an angle adjustment sensor for understanding an adjustment angle at which the support portion needs to be rotated to arrange the memory module array with the socket; and a control portion for controlling the first driving portion and the second driving portion so that the support portion is transferred to the seating position and rotated in response to the adjustment angle, wherein the angle adjustment sensor understands the adjustment angle by recognizing two setting areas positioned adjacent to the socket, and the two setting areas guide a disposition state of the socket, and wherein:

the two setting areas are more protruded or recessed than adjacent areas; and the angle adjustment sensor measures a distance by scanning a first area including one of the two setting areas and a second area including the other of the two setting areas, respectively, and recognizes two areas having a critical distance difference from surroundings in the first area and the second area as the two setting areas.

2. The system of claim 1, wherein:

the initial position and the seating position have different coordinates along a first axis, a second axis, and a third axis; and the first driving portion includes:

a first axis driving portion for transferring the support portion along the first axis;

a second axis driving portion for transferring the support portion along the second axis; and a third axis driving portion for transferring the support portion along the third axis.

3. The system of claim 2, wherein:

the test tray moves along the first axis and the second axis and then enters the seating position along the third axis; and the two setting areas are positioned such that an imaginary line connecting the two setting areas forms an angle to the third axis.

4. The system of claim 2, wherein:

the transfer further includes a rail formed along the first axis so that the first axis driving portion transfers the support portion;

a plurality of testers may be provided, and the plurality of testers are arranged on both sides of the rail along a longitudinal direction of the rail; and the control portion has the test tray seated in each of the testers in a preset order.

5. The system of claim 1, wherein:

a plurality of through slits into which the memory modules are respectively inserted are formed in the test tray; and the mounter presses the memory module array on one side of the through slit to mount the memory module array on the socket positioned on the other side of the through slit.

6. A method for a memory module mounting test, the method comprising:

loading a memory module array in which a plurality of memory modules are positioned in a predetermined pattern on a test tray;

transferring, by a transfer, the test tray to a tester in which a socket corresponding to the predetermined pattern is formed;

rotating the test tray by the transfer so that the memory module array is arranged with the socket; and mounting, by a mounter, the memory module array in the socket and performing, by the tester, a test on the memory module array wherein, in the rotating of the test tray by the transfer, the transfer understands an angle at which the test tray needs to be rotated to arrange the memory module array with the socket by recognizing two setting areas positioned adjacent to the socket, and the two setting areas guide a disposition state of the socket, and wherein:

the two setting areas are more protruded or recessed than adjacent areas; and the transfer measures a distance by scanning a first area including one of the two setting areas and a second area including the other of the two setting areas, respectively, and recognizes two areas having a critical distance difference from surroundings in the first area and the second area as the two setting areas.

* * * * *